(12) United States Patent
Jean et al.

(10) Patent No.: US 6,402,092 B1
(45) Date of Patent: Jun. 11, 2002

(54) TURBOJET-ENGINE THRUST REVERSER WITH DOORS MOUNTED ON CENTERED PIVOTS

(75) Inventors: Michel Christian Marie Jean, Montivilliers; Laurent Marcel Vicogne, Rolleville, both of (FR)

(73) Assignee: Hispano Suiza Aerostructures, Gonfreville L'Orcher (FR)

( * ) Notice: Subject to any disclaimer, the term of this patent is extended or adjusted under 35 U.S.C. 154(b) by 0 days.

(21) Appl. No.: 09/684,677

(22) Filed: Oct. 11, 2000

(30) Foreign Application Priority Data

Oct. 14, 1999 (FR) .............................. 99 12805

(51) Int. Cl.⁷ .............................................. B64C 25/68
(52) U.S. Cl. ..................................... 244/110 B; 265/33
(58) Field of Search .......................... 244/110 B, 73 C; 239/265.19, 265.29, 265.31, 265.33

(56) References Cited

U.S. PATENT DOCUMENTS

| | | |
|---|---|---|
| 3,605,411 A | 9/1971 | Maison et al. |
| 5,120,004 A | 6/1992 | Matthias |
| 5,548,954 A * | 8/1996 | de Cambray et al. ...... 60/226.2 |
| 5,930,991 A | 8/1999 | Fournier et al. |
| 6,094,908 A * | 8/2000 | Baudu et al. .............. 60/226.2 |

FOREIGN PATENT DOCUMENTS

| | | | |
|---|---|---|---|
| EP | 0 846 854 A1 | 6/1998 | |
| FR | 1482538 | 5/1967 | |
| FR | 2030034 | 10/1970 | |
| FR | 2769953 | * 10/1997 | ............. F02K/1/70 |
| FR | 2769953 | 4/1999 | |

* cited by examiner

Primary Examiner—Peter M. Poon
Assistant Examiner—Timothy D. Collins
(74) Attorney, Agent, or Firm—Bacon & Thomas, PLLC

(57) ABSTRACT

A turbojet-engine thrust reverser is provided with thrust reverser door assemblies each having a pivoting thrust reverser door (7). The thrust reverser door is connected to two pivots (22, 23) that rest on a support fitting (24) to constitute a structural frame that is attached to longitudinal beam cowling portions (20, 21) and a downstream cowling portion (3) of a stationary thrust-reverser structure in order to constitute a rigid assembly between the upstream and downstream cowling portions (4, 3). At least one primary mechanical lock (26) is placed on at least one longitudinal side of the door (7) and the interface loads of the lock (26) are absorbed by the beam cowling portions (20, 21).

6 Claims, 5 Drawing Sheets

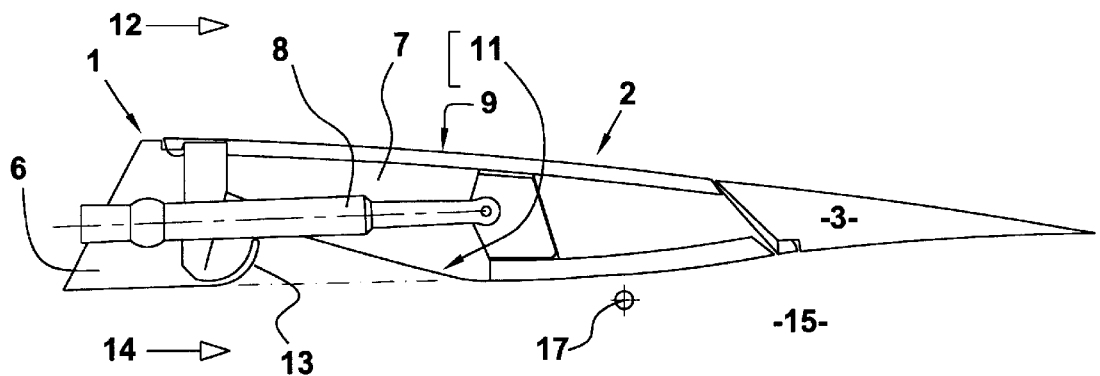
Fig : 1
(PRIOR ART)
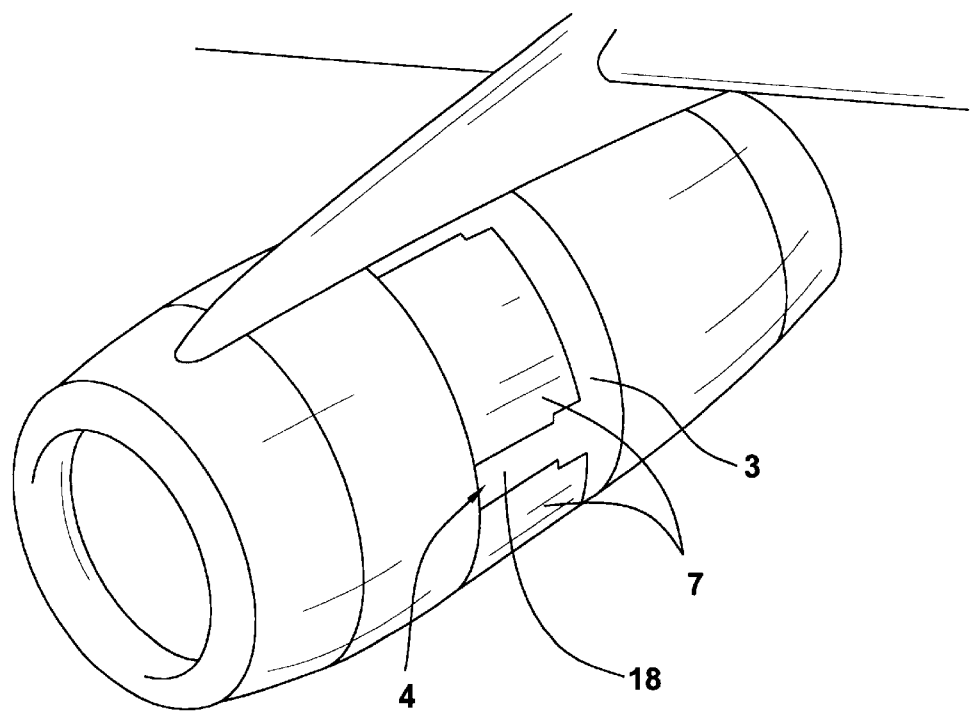
Fig : 2
(PRIOR ART)

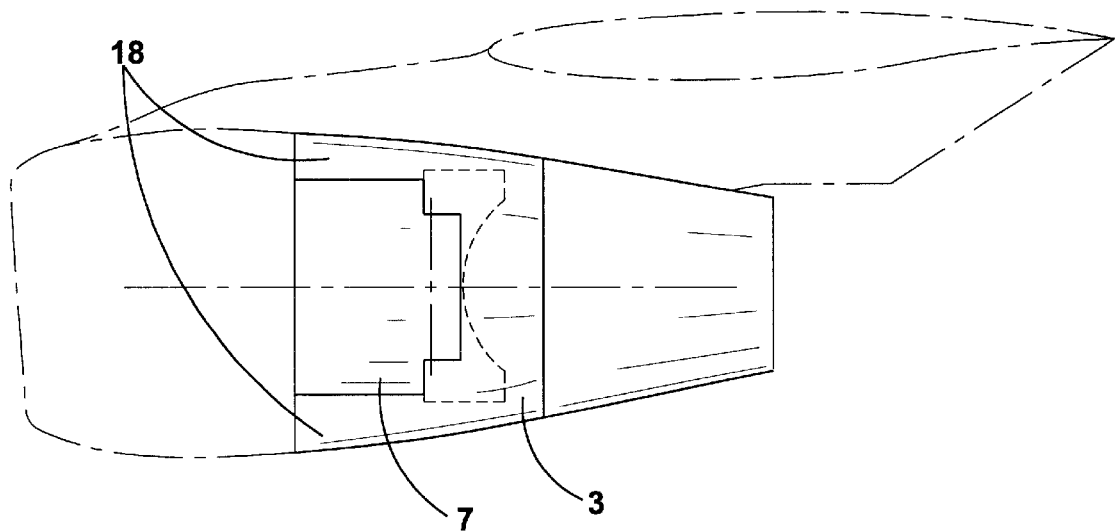
Fig : 3
(PRIOR ART)
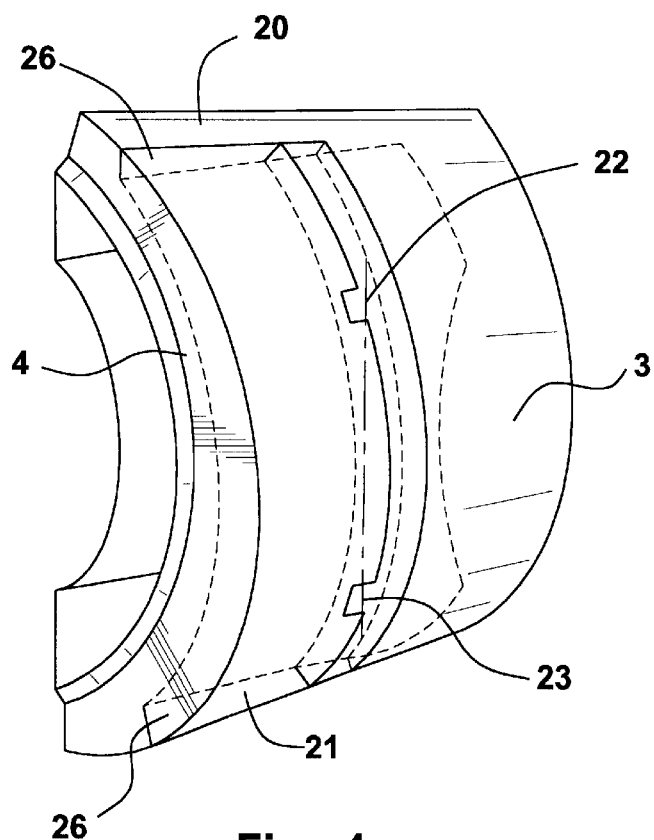
Fig : 4

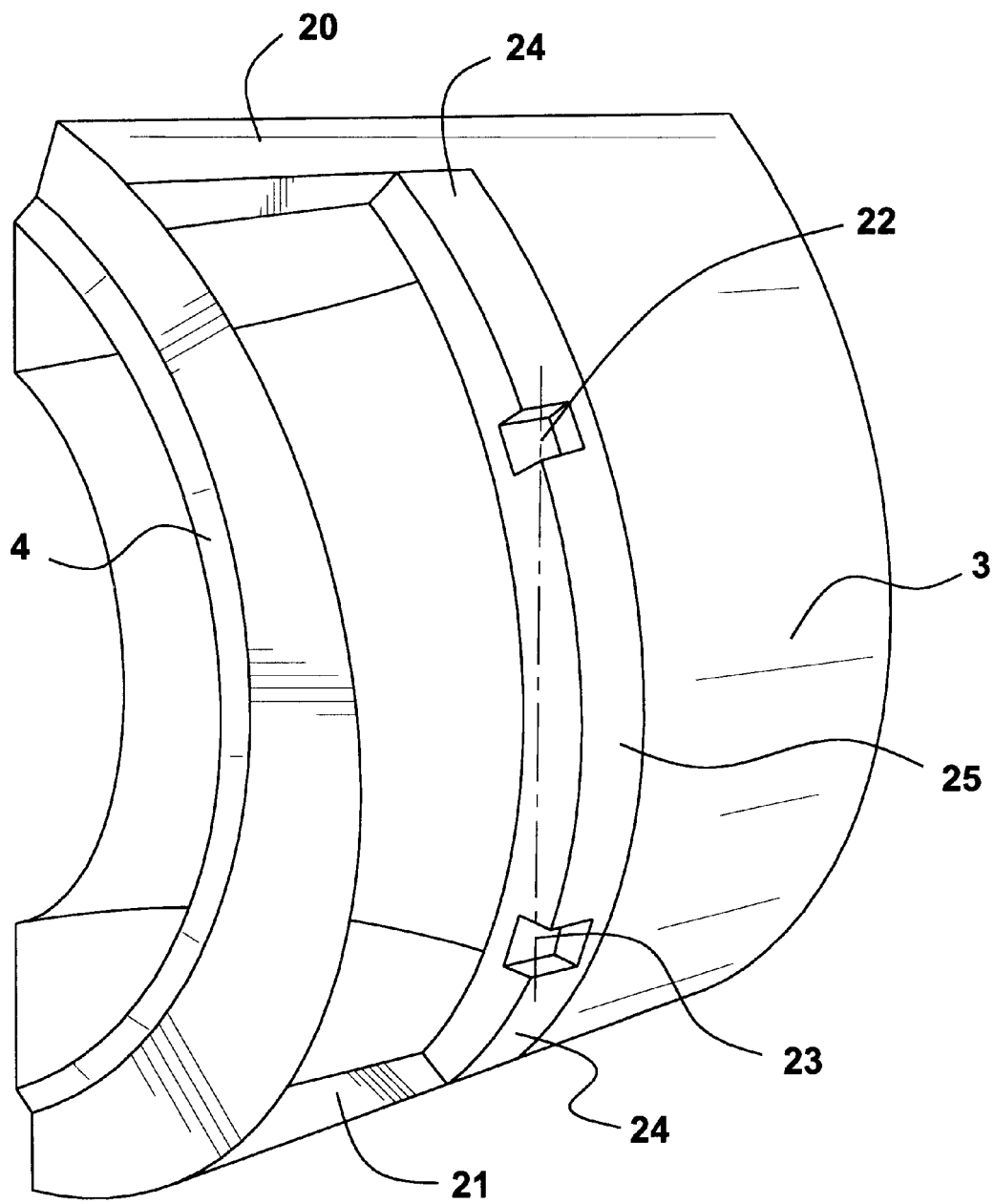
Fig : 5

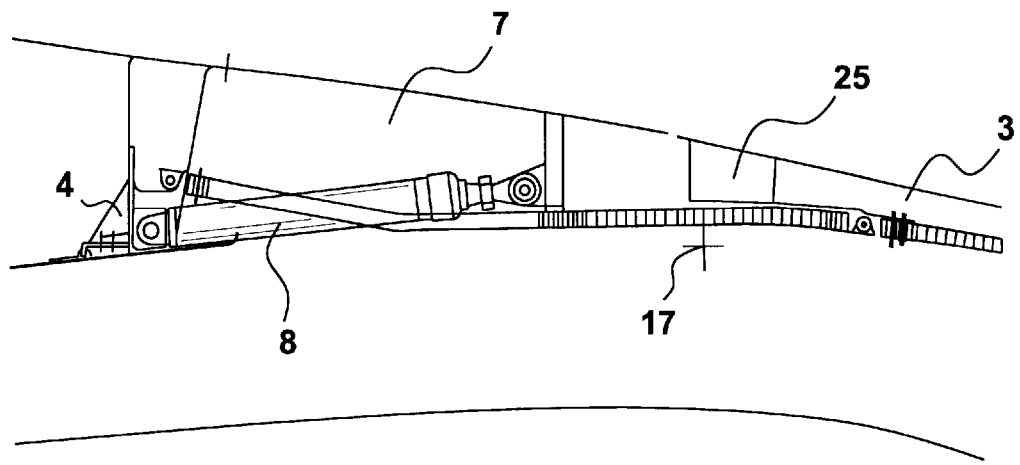
Fig : 6
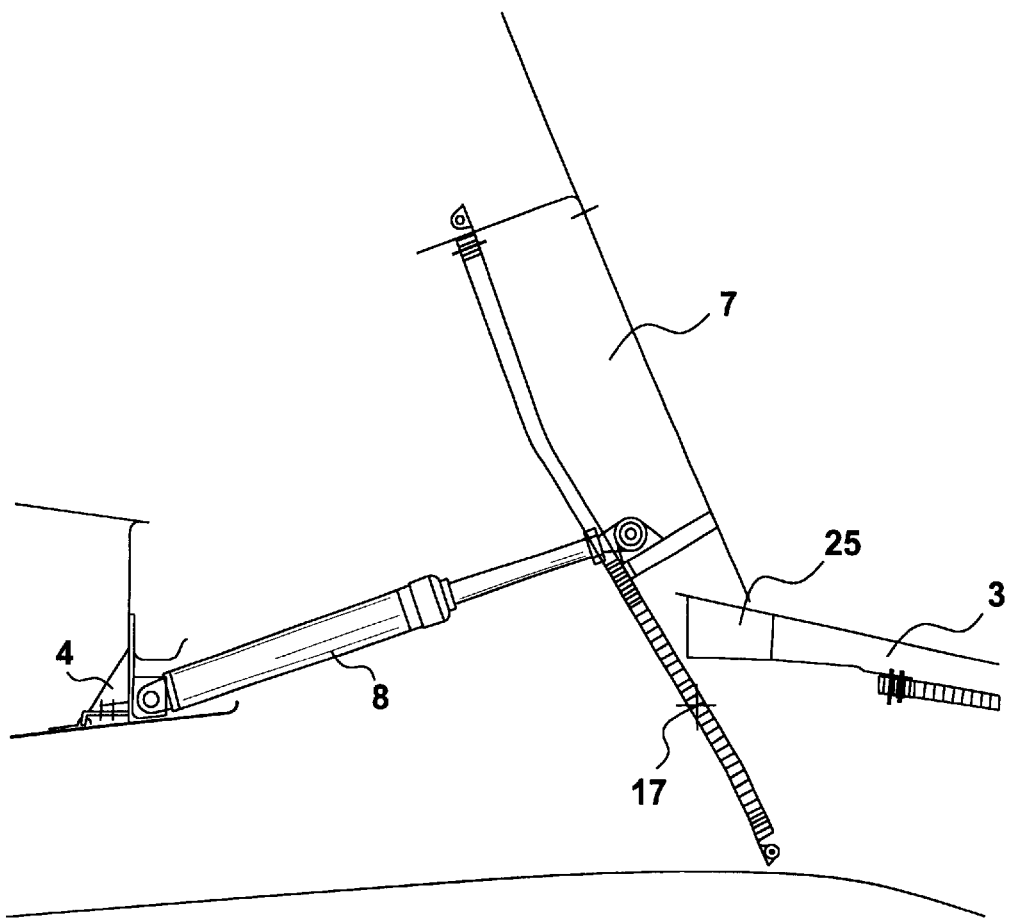
Fig : 7

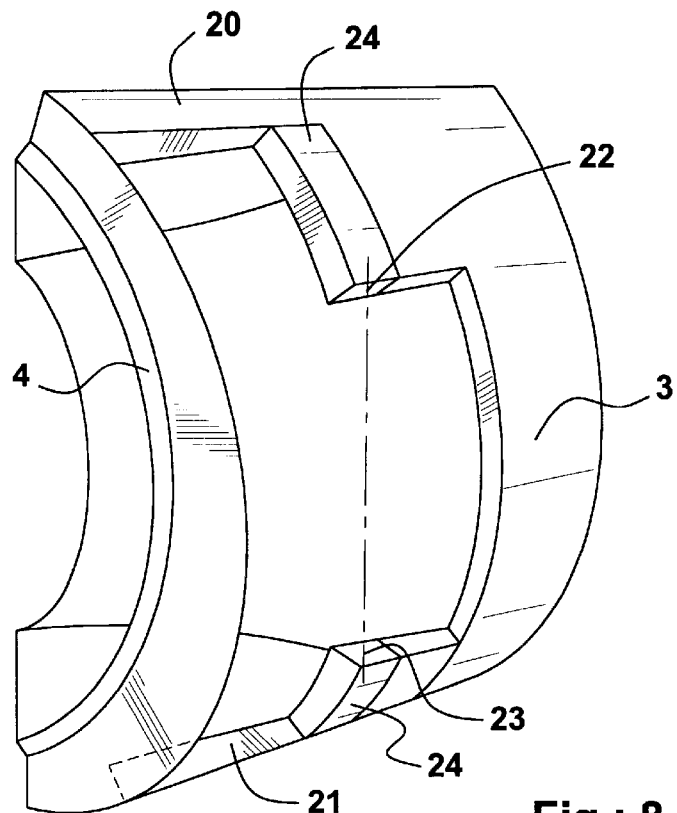
Fig : 8
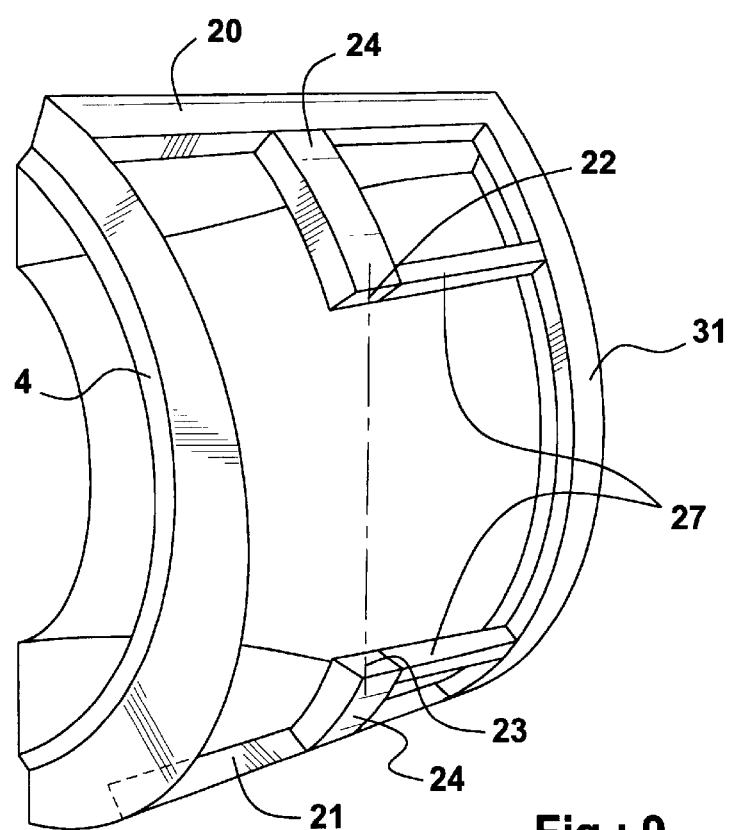
Fig : 9

TURBOJET-ENGINE THRUST REVERSER WITH DOORS MOUNTED ON CENTERED PIVOTS

BACKGROUND OF THE INVENTION

1. Field of the Invention

The present invention relates to a thrust reverser for a turbofan-type engine in which pivotable thrust reverser doors change the direction of the flow of gases passing through an annular duct to provide thrust reversing forces. More particularly, the present invention relates to such thrust reverser doors being mounted on centered pivots connecting to a downstream cowling portion.

2. Related Art

Turbofan-type turbojet engines are well known in the art and comprise an annular duct to the rear of the fan for the purpose of channeling the so-called cold, bypass flow. This annular duct is bounded on the inside by the engine cowling and on the outside by a fan cowling. The annular duct may channel both the bypass flow and the primary exhaust gas flow at a downstream portion, or may channel only the bypass flow. It is known to provide one or more pivotable thrust reversing doors in the annular duct to redirect the cold flow gas laterally outwardly through a lateral opening in the cowling.

FIGS. 1, 2 and 3 illustrate a known pivoting door-type thrust reverser associated with the fan cowling of a turbofan-type turbojet engine. As illustrated in FIG. 1, the upstream portion of the fan cowling which defines the outer limits of the bypass flow duct and which is generally concentrically arranged about the turbojet engine (not shown) comprises an external cowling panel and an internal cowling panel interconnected by a frame 6. The outer surface of the external cowling panel has an aerodynamic surface over which the air external to the engine passes during aircraft flight in the direction of the arrow 12. The inner surface of the inner cowling panel defines the outer boundary of the bypass flow duct through which the bypass air flows in the direction of arrow 14.

The fan cowling also comprises a trust reverser, illustrated generally in FIG. 1, and a downstream cowling portion 3. The thrust reverser comprises a door 7 pivotally attached to the cowling such that it is movable between a closed, forward thrust position, illustrated in FIG. 1. The door also has an open, reverse thrust position in which the upstream end (toward the left as viewed in FIG. 1) of the thrust reverser door 7 is moved outwardly from the cowling, while a downstream portion is moved inwardly into the bypass flow duct airstream so as to redirect at least a portion of the bypass flow through an opening in the fan cowling in a direction that has a reverse thrust component.

An actuator 8 for moving the door 7 between its forward thrust and reverse thrust positions may comprise a hydraulic cylinder mounted to the frame 6, and have an extendible and retractable piston rod connected to the thrust reverser door 7.

The thrust reverser door 7 has an outer door panel 9 and an inner door panel 11 joined together by an internal structure. The upstream end of the door 7 may have a deflector 13 to maximize the efficiency of the thrust reverser when the door 7 is in the reverse thrust position. When the door is in the forward thrust position, as illustrated in FIG. 1, the outer door panel 9 is substantially flush with the external surfaces of the upstream panel and the downstream cowling portion 3.

As illustrated in FIG. 2, a plurality of thrust reverser doors 7 may be incorporated into the fan cowling, such doors being circumferentially spaced around the periphery of the fan cowling. A beam cowling portion 18 of the fan cowling extends from an upstream cowling portion 4 to the downstream cowling portion 3. The beam cowling portion provides structural rigidity to the fan cowling and provides pivot mounting points for attaching the doors 7 to the fan cowling. French Patents 1,482,538 and 2,030,034 illustrate typical, known thrust reversers. U.S. Pat. No. 3,605,411 discloses a pivoting door-type thrust reverser in which the deflector mounted on the upstream or forward end of the thrust reverser door is movable to an extended position when the door is in the reverse thrust position.

Typically, the doors are arranged about pivots comprising a fixed structure extending from the cowling along the longitudinal sides of the door side walls. In one embodiment, the doors pivot about cantilevered longitudinal beams extending from the cowling. The described known pivot structures incur major drawbacks because the doors are not rigidly articulated due to the substantial forces exerted on the cantilevered longitudinal beams. Moreover, the known pivot structures add weight to the thrust reverser.

Most door-type thrust reversers have several locking systems to keep the doors locked in the forward thrust position. The primary lock is often situated between the frame of the cowling adjacent to the front side of the reverse thrust opening and located along the longitudinal axis of the thrust reverser door and at the upstream edge of the thrust reverser door. When the thrust reverser door is constrained by a central primary lock located along the longitudinal axis of the door, additional structure is required to reinforce the cowling frame. This configuration may lead to door deformations, in particular along the door corners as a result of flow-exerted pressure which in turn decreases the aerodynamic efficiency of the thrust reverser in a forward position.

SUMMARY OF THE INVENTION

A thrust reverser is disclosed for a turbojet engine having a cowling forming an outer boundary of a gas flow duct through which gases flow from a forward cowling portion to a rear cowling portion. The cowling has at least one reverse thrust opening between the forward cowling portion and the rear cowling portion communicating with the gas flow duct. Two cowling beam portions are located between the forward cowling portion and the rear cowling portion, and subtending the reverse thrust opening. A support fitting is connected to the rear cowling portion at the edge adjacent to the reverse thrust opening and to the two beam portions.

A thrust reverser door is pivotally attached to two door pivots which are supported by the support fitting, mounted parallel to a longitudinal axis of the cowling and spaced from opposite lateral sides of the thrust reverser door. The thrust reverser door is articulated on the two pivots so as to move between a forward thrust position wherein the thrust reverser door covers the at least one reverser thrust opening, and a reverse thrust position wherein the at least one reverse thrust opening is uncovered and the thrust reverser door directs at least a portion of the gases flowing through the duct through the one reverse thrust opening.

Further, a locking system is disclosed for an aircraft jet engine thrust reverser door that is located along the side of the thrust reverser door and adjacent to the beam cowling portion. The locking system is arranged to lock with the beam portion such that the locking system locks thrust reverser door in a forward position. By locating the locking system along the side of the thrust reverser door adjacent to the beam portion, the drawbacks of the known locking systems are obviated.

An object of the present invention is to avoid substantial loads acting on the cowling beam portions during a reverse thrust position by eliminating supporting pivots on cantilevered longitudinal beams and providing a locking system along the side of the thrust reverser door adjacent to the cowling beam portion. Further, the overall weight of the thrust reverser system is reduced compared to known systems.

BRIEF DESCRIPTION OF THE DRAWINGS

FIG. 1 is a partial, longitudinal, cross-sectional view of a known type of pivoting thrust reverser illustrating the forward thrust positions of the thrust reverser door;

FIG. 2 is a perspective view of a cowling incorporating the known thrust reversers circumferentially spaced apart about the cowling;

FIG. 3 is a perspective view of a cowling mounted on an aircraft and equipped with a two-door thrust reverser in a forward thrust position;

FIG. 4 is a perspective view of a portion of a thrust reverser of the present invention illustrating the pivots and the thrust reverser in a forward thrust position;

FIG. 5 is a perspective view similar to FIG. 4 and illustrating the thrust reverser of the present invention without a thrust reverser door and a support fitting configuration;

FIG. 6 is a partial, longitudinal, cross-sectional view illustrating the present invention in the forward thrust position;

FIG. 7 is a partial, longitudinal, cross-sectional view illustrating the present invention in the reverse thrust position;

FIG. 8 is a perspective view illustrating an alternate support fitting configuration from that illustrated in FIG. 5; and FIG. 9 is a perspective view illustrating another alternate support fitting configuration from that illustrated in FIG. 5.

DETAILED DESCRIPTION OF THE PREFERRED EMBODIMENTS

In the descriptions of the various embodiments of the present invention, the portions of the cowling and thrust reverser door have the same or similar structure and/or function as the known prior art device illustrated in FIGS. 1 and 2, and have been assigned the same identifying numerals. Thus the present invention encompasses an engine cowling 1, an upstream cowling portion 4, and a thrust reverser door 7 pivotally connected to a downstream cowling portion 3.

The thrust reverser according to the present invention has an upstream cowling portion 4 and a downstream cowling portion 3 that are connected by an upper, stationary, longitudinal beam 20 in a 12 o'clock position and by a lower, stationary, longitudinal beam 21 in the a 6 o'clock position. As illustrated in FIGS. 4 and 5, pivots 22, 23 connect to the thrust reverser door, namely an upper pivot 22 and a lower pivot 23. The two pivots 22, 23 are mounted parallel to a longitudinal axis of the cowling and spaced from opposite lateral sides of the thrust reverser door. The pivots 22, 23 are attached to a support fitting 24. The support fitting 24 connects to the downstream cowling portion 3 at the edge adjacent to the reverse thrust opening and also attaches to the two beam portions 20, 21.

As illustrated in FIG. 4, a locking mechanism 26 is located on the thrust reverser door 7 side adjacent to the cowling beam portion 20. A locking mechanism may also be incorporated along either one of the cowling beam portions 20, 21, and further there may be locking mechanisms located on both sides of the thrust reverser door 7.

FIG. 8 is an alternate embodiment illustrated in FIG. 5 illustrating the support fitting 24 in segments subtending a cavity formed by the downstream cowling portion 3. In this embodiment, the fitting support 24 is directly connected to the downstream cowling portion 3.

FIG. 9 is another alternate embodiment illustrated in FIG. 5 illustrating linkages 27 between the support fitting 24 segments and the downstream cowling portion 3.

The foregoing description is provided for illustrative purposes only and should not be construed as in any way limiting this invention, the scope of which is defined solely by the appended claims.

We claim:

1. A thrust reverser for a turbojet engine having a cowling forming an outer boundary of a gas flow duct through which gases flow from an upstream cowling portion to a downstream cowling portion, the cowling having at least one reverse thrust opening between the upstream cowling portion and the downstream cowling portion, and communicating with the gas flow duct, the thrust reverser having at least one thrust reverser assembly comprising:

a thrust reverser door;

two beam cowling portions extending between the upstream cowling portion and the downstream cowling portion, subtending the reverse thrust opening and being adjacent to a thrust reverser door;

a support fitting being fixedly attached to the two beam portions and connected to an edge of the downstream cowling portion adjacent to the reverse thrust opening; and two thrust reverser door pivots attached to and supported by the support fitting, the thrust reverser door pivots being mounted parallel to a longitudinal axis of the upstream and downstream cowling portions and spaced from opposite lateral sides of the thrust reverser door, wherein the one thrust reverser door is pivotally connected to the two thrust reverser door pivots so as to move between a forward thrust position wherein the thrust reverser door covers the reverse thrust opening, and a reverse thrust position wherein the at least one reverse thrust opening is uncovered and the thrust reverser door directs at least a portion of the gases flowing through the duct through the reverse thrust opening.

2. The thrust reverser of claim 1 further comprising two thrust reverse door assemblies.

3. The thrust reverser of claim 1 further comprising at least one mechanical lock being located on a side of the thrust reverser door adjacent to one of said beam portions, the at least one mechanical lock being arranged to lock the thrust reverser door in a forward position with at least one of said beam cowling portions.

4. The thrust reverser of claim 1 wherein the support fitting is attached to a rear frame of the downstream cowling portion.

5. The thrust reverser of claim 1 wherein the support fitting is connected to the downstream cowling portion by being attached to linkages that are attached to the downstream cowling portion.

6. The thrust reverser of claim 1 wherein the downstream cowling portion includes a recess parallel to a longitudinal axis of the reverse thrust opening and extending downstream a predetermined depth from the rear edge of the downstream cowling portion adjacent to the reverse thrust opening, the support fitting being divided into two segments and attached to two remaining portions of the rear edge of the downstream cowling portion adjacent to the reverse thrust opening.

* * * * *